(12) United States Patent
Kani et al.

(10) Patent No.: US 8,151,958 B2
(45) Date of Patent: Apr. 10, 2012

(54) POWER TRANSMITTING DEVICE

(75) Inventors: Masakatsu Kani, Kariya (JP); Akio Matsumoto, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 999 days.

(21) Appl. No.: 11/860,085

(22) Filed: Sep. 24, 2007

(65) Prior Publication Data

US 2008/0078622 A1    Apr. 3, 2008

(30) Foreign Application Priority Data

Sep. 29, 2006 (JP) ................................. 2006-269700

(51) Int. Cl.
*F16D 27/115* (2006.01)
(52) U.S. Cl. ...... 192/35; 192/84.7; 192/70.23; 192/93 A
(58) Field of Classification Search ............. 192/35, 192/70.23, 93 A
See application file for complete search history.

(56) References Cited

U.S. PATENT DOCUMENTS

| | | | | |
|---|---|---|---|---|
| 5,890,573 | A | * | 4/1999 | Kwoka ........................... 192/35 |
| 6,880,688 | B2 | * | 4/2005 | Matsumoto ..................... 192/35 |
| 2004/0188212 | A1 | | 9/2004 | Weilant |
| 2005/0167229 | A1 | | 8/2005 | Tsukada et al. |

FOREIGN PATENT DOCUMENTS

| | | |
|---|---|---|
| GB | 2 308 426 A | 6/1997 |
| JP | 09-222138 | 8/1997 |
| JP | 2001-330060 | 11/2001 |
| JP | 2004-108575 | 4/2004 |

OTHER PUBLICATIONS

Office Action issued May 24, 2011, in Japanese Patent Application No. 2006-269700.

* cited by examiner

*Primary Examiner* — David D Le
*Assistant Examiner* — Ryan Dodd
(74) *Attorney, Agent, or Firm* — Oblon, Spivak, McClelland, Maier & Neustadt, L.L.P.

(57) ABSTRACT

A cam mechanism is provided with a forward rotation plate and a reverse rotation plate. The respective plates are urged by the respective coil springs in the directions opposite to each other. When the number of rotations of the front wheels becomes great relative to the number of rotations of the rear wheels, the forward rotation plate rotates. Thus, a main cam which is urged by the respective coil springs toward the neutral position rotates together with the forward rotation plate when the forward rotation plate rotates. When the number of rotations of the rear wheels becomes great relative to the number of rotations of the front wheels, the reverse rotation plate rotates. Thus, the main cam which is urged by the respective coil springs toward the neutral position rotates together with the reverse rotation plate when the reverse rotation plate rotates.

8 Claims, 4 Drawing Sheets

POWER TRANSMITTING DEVICE

BACKGROUND OF THE INVENTION

The present invention relates to a power transmitting device.

The power transmitting device disclosed in Japanese Laid-Open Patent Publication No. 2004-108575, for example, is provided with a cylindrical rotating member which rotates when a driving force is inputted and a rotary shaft member which is placed within the cylindrical rotating member so as to be freely rotatable and coaxial with the cylindrical rotating member. In the case of the device disclosed in this document, a clutch mechanism provided between the cylindrical rotating member and the rotary shaft member permits torque to be transmitted between the cylindrical rotating member and the rotary shaft member. This power transmitting device is provided with a cam mechanism as shown in FIG. 7. The cam mechanism is provided with spherical bodies 83 and a stopper body 84 between a main cam 81 and a pilot cam 82. In this cam mechanism, the main cam 81 and the stopper body 84 are urged by a torsion spring 85 to be rotated so that a protrusion 86 of the main cam 81 and an engaging protrusion 87 of the stopper body 84 engage with each other.

The pilot cam 82 receives the rotation of the engine provided in the front portion of the vehicle through an electromagnetic clutch and a pilot clutch. When the rotational torque generated in the pilot cam 82 exceeds the urging force of the torsion spring 85, the pilot cam 82 and the main cam 81 rotate relative to each other. Thus, as the result of this relative rotation, the spherical bodies 83 between the two cams 81 and 82 move the main cam 81 in the axial direction. Then, the driving force is transmitted from the engine to the rear wheels through a main friction clutch (not shown). On the other hand, when the vehicle is being towed, even if the electromagnetic clutch is turned off so that a drag torque resulting from the rotation of the rear wheels is generated in the pilot clutch, the relative rotation of the pilot cam 82 and the main cam 81 is restricted in the case where the torque is no greater than the urging force of the torsion spring 85. Therefore, the main friction clutch is prevented from being erroneously activated.

In the above described power transmitting device, clutch plates of the main friction clutch sometimes rub against each other even when the main friction clutch is not engaged. In addition, a great number of main frictional clutches are a wet type clutch, in which lubricant exists between the respective clutch plates is formed. Therefore, in the case where the number of rotations of the front wheels becomes greater than that of the rear wheels, for example, when a spare tire for emergencies is used or at the time of quick acceleration, a problem arises where part of the torque becomes drag torque due to the viscosity of the lubricant intervened between the clutch plates, and is transmitted to the driven side.

SUMMARY OF THE INVENTION

An objective of the present invention is to provide a power transmitting device where a drag torque generated as a result of the rotational difference between the front and rear wheels is reduced.

In accordance with the foregoing objective and in accordance with one aspect of the present invention, a power transmitting device for transmitting a driving force between front wheels and rear wheels is provided. The power transmitting device includes a first rotational member linked to the front wheels, a second rotational member linked to the rear wheels, a main clutch provided between the two rotational members for controlling the transmission of driving force between the two rotational members, and a cam mechanism for applying a pressing force in an axial direction to the main clutch. The cam mechanism has a first cam member and a second cam member. The first and second cam members rotate relative to each other due to rotational torque transmitted via the first or second rotational member. Thus, a pressing force in the axial direction is applied to the main clutch. The cam mechanism has a first elastic member for urging the first cam member toward a neutral position where no pressing force is applied to the main clutch, and a second elastic member for urging the second cam member toward the neutral position. The direction in which the second elastic member urges is opposite to the direction in which the first elastic member urges.

DETAILED DESCRIPTION OF THE PREFERRED EMBODIMENTS

In the following, a power transmitting device 10, according to one embodiment of the present invention will be described in accordance with the drawings. The power transmitting device 10 transmits driving force between the front and rear wheels of a four-wheel drive vehicle.

Figure 1:
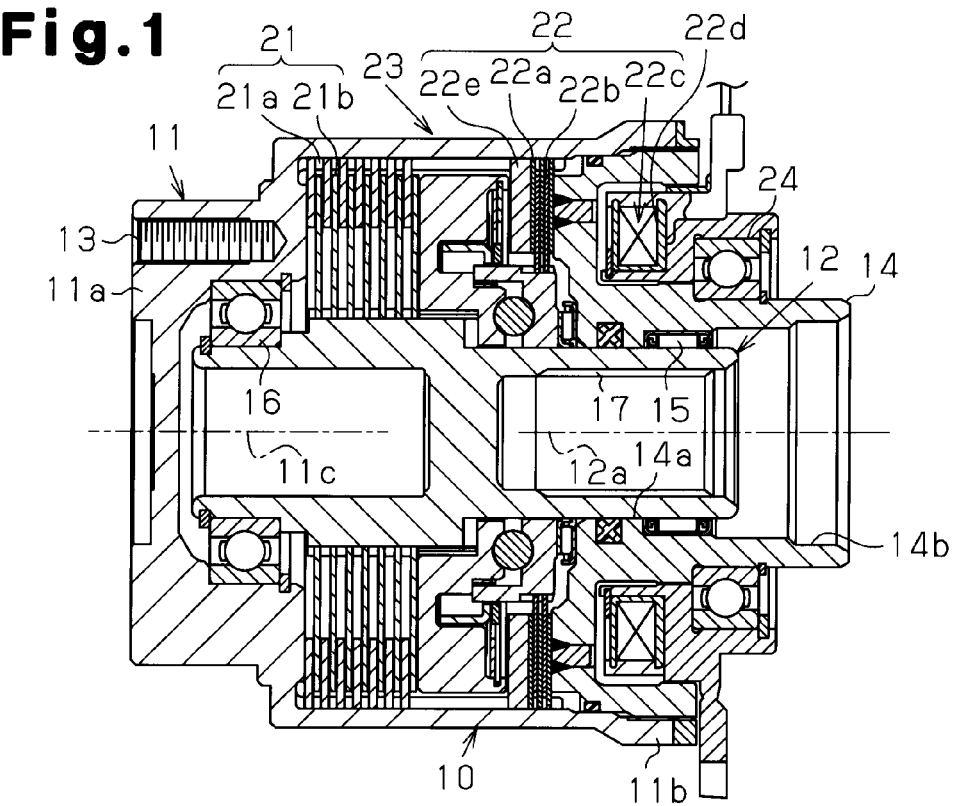
FIG. 1 is a cross-sectional view showing a power transmitting device according to one embodiment of the present invention.

As shown in FIG. 1, the power transmitting device 10 is used in a front wheel drive-based four-wheel drive vehicle, in which driving force is always transmitted to the front wheels from the drive source, such as an engine or an electric motor, and the driving force is also distributed to the rear wheels depending on the running state of the vehicle. In the case of this four-wheel drive vehicle, the driving force from the drive source mounted in the front of the vehicle is transmitted to the axle shaft of the front wheels via a transfer case so that the front wheels are driven. The transfer case is also linked to the power transmitting device 10 via a drive shaft. The power transmitting device 10 is linked to the axle shaft of the rear wheels via a drive pinion shaft and a differential gear. This power transmitting device 10 links the drive shaft and the drive pinion shaft to each other so that torque can be transmitted therebetween. In the case where the drive shaft and the drive pinion shaft are linked via the power transmitting device 10, the driving force of the engine is transmitted to the axle shaft of the rear wheels via the power transmitting device 10, the drive pinion shaft, and the differential gear, so that the rear wheels are driven.

The power transmitting device 10 is provided with a front housing member 11, which is a first rotating member, and an inner shaft 12, which is a second rotating member. The front housing member 11 is formed in cylindrical form having a bottom. The inner shaft 12 is formed into a hollow shaft form and placed so as to be freely rotatable within the front housing member 11 and coaxial with the front housing member 11.

A threaded hole 13, which is a linking portion, is created in the bottom portion 11a of the front housing member 11. The front housing member 11 is linked to a propeller shaft (not shown) by threading a bolt (not shown) into the threaded hole 13 so as to be rotated together with the propeller shaft by the driving force generated by the engine (not shown), which is the drive source. Instead of this, a linking portion in a shaft form may be created by forming a spline in the outer periphery of the front housing member 11 so that the front housing member 11 and the propeller shaft are linked through this linking portion.

In addition, an annular rear housing member 14 is engaged with an open end 11b of the front housing member 11. An end portion of the inner shaft 12 is inserted into the center hole 14a of the rear housing member 14. The inner shaft 12 is supported so as to be freely rotatable by the bearing 15 within the center hole 14a and the ball bearing 16 within the front housing member 11. A linking portion (spline engaging portion) 17 to the rear differential (not shown) is formed on the inner circumferential surface of the inner shaft 12 in the vicinity of the rear housing member 14 (right side of FIG. 1).

A main clutch 21, which is a clutch mechanism for linking the front housing member 11 and the inner shaft 12 so that torque can be transmitted therebetween, is provided within the front housing member 11. A pilot clutch 22 is provided within the front housing member 11 in a location at a distance from the main clutch 21 in the axial direction, that is to say, in the vicinity of the rear housing member 14. A cam mechanism 23 is provided within the front housing member 11 between the main clutch 21 and the pilot clutch 22.

A multi-plate friction clutch is used as the main clutch 21. The main clutch 21 is configured by alternately placing a number of outer clutch plates 21a and inner clutch plates 21b which are moveable in the axial direction. The respective outer clutch plates 21a are moveable in the axial direction by means of spline engagement with the inner circumferential surface of the front housing member 11 and rotatable together with the front housing member 11. The respective inner clutch plates 21b are moveable in the axial direction by means of spline engagement with the outer circumferential surface of the inner shaft 12 and rotatable together with the inner shaft 12. In the main clutch 21, the respective outer clutch plates 21a and the respective inner clutch plates 21b are pressed toward the front housing member 11 along the axial direction so that these engage with each other through friction. As a result, the front housing member 11 and the inner shaft 12 are linked so that torque can be transmitted therebetween.

Figure 2:
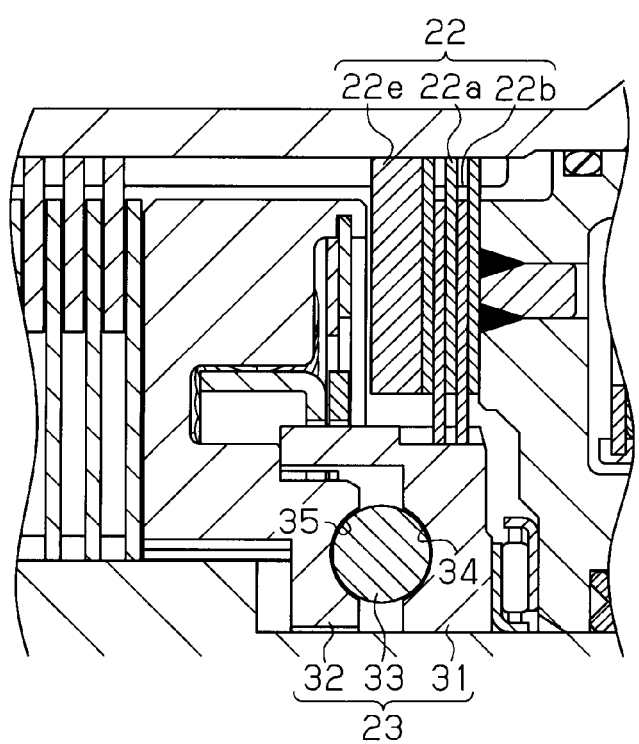
FIG. 2 is a partially cross-sectional view showing an enlarged portion of the cam mechanism of the power transmitting device.

As shown in FIG. 2, the cam mechanism 23 is provided with a pilot cam 31, which is a first cam member, a main cam 32, which is a second cam member, and balls 33, which are located between the two cams 31 and 32. The pilot cam 31 is supported so as to be freely rotatable around an axis 12a relative to the inner shaft 12. The main cam 32 is engaged with the outer circumferential surface of the inner shaft 12 by menas of spline. As a result, the main cam 32 is moveable along an axis 11c and rotatable together with the inner shaft 12 around the axis 11c.

The pilot cam 31 and the main cam 32 are formed in disc form. The pilot cam 31 is placed in the proximity to the rear housing member 14, and the main cam 32 is placed in the proximity to the main clutch 21. The outer circumferential surface of the pilot cam 31 is engaged with the inner circumferential of the below described inner clutch plate 22b by means of spline, and the main cam 32 is engaged with the outer circumferential surface of the inner shaft 12 by means of spline. A number of cam grooves 34 and 35 are formed on the two facing surfaces of the pilot cam 31 and the main cam 32 so as to face each other. The balls 33 are placed between the facing cam grooves 34 and 35 and held by the pilot cam 31 and the main cam 32. In the cam mechanism 23, when the pilot cam 31 and the main cam 32 rotate relative to each other, the main cam 32 moves along the axial direction through the engagement of the cam grooves 34, 35 and the balls 33, so as to move away from the pilot cam 31.

A multi-plate friction clutch is used as the pilot clutch 22 in the same manner as the main clutch 21. The pilot clutch 22 is formed by alternately placing a number of outer clutch plates 22a and inner clutch plates 22b which are moveable in the axial direction. The respective outer clutch plates 22a are engaged with the inner circumferential surface of the front housing member 11 by means of spline. As a result, the respective outer clutch plates 22a are moveable in the axial direction and rotatable together with the front housing member 11. The respective inner clutch plates 22b are engaged with the outer circumferential surface of the pilot cam 31 by means of spline. As a result, the respective inner clutch plates 22b are moveable in the axial direction and rotatable together with the pilot cam 31. In the pilot clutch 22, the respective outer clutch plates 22a and the respective inner clutch plates 22b are pressed toward the rear housing member 14 along the axial direction so as to engage with each other through friction. As a result, the front housing member 11 and the pilot cam 31 are linked so that torque can be transmitted therebetween.

When the pilot clutch 22 is not operating, the pilot cam 31 is rotatably coupled to the main cam 32 and the inner shaft 12, while holding the balls 33 with the main cam 32. In this case, there is a rotational difference between the front housing member 11 and the pilot cam 31, which corresponds to a rotational difference between the front housing member 11 and the inner shaft 12. Thus, the pilot clutch 22 operates in such a manner that the front housing member 11 and the pilot cam 31 are linked so that torque can be transmitted therebetween, and thus, torque on the basis of the rotational difference between the front housing member 11 and the inner shaft 12 (pilot cam 31) is transmitted to the cam mechanism 23.

In other words, when the torque on the basis of the rotational difference between the pilot cam 31 and the main cam 32 is transmitted to the cam mechanism 23 as a result of the operation of the pilot clutch 22 in the power transmitting device 10, the cam mechanism 23 moves the main cam 32 in the axial direction so that the main cam 32 comes close to the main clutch 21. That is to say, the cam mechanism 23 converts the torque on the basis of the rotational difference between the front housing member 11 and the inner shaft 12 into a pressing force in the axial direction, and presses the main clutch 21 through the main cam 32. This activates the main clutch 21, so that the front housing member 11 and the inner shaft 12 are linked so that torque can be transmitted therebetween.

As shown in FIG. 1, the pilot clutch 22 is an electromagnetic clutch having an electromagnet 22c as a drive source. An annular groove 22d having an opening on the same side of the opening of the front housing member 11 is created in the rear housing member 14. The electromagnet 22c is contained within this groove 22d. The rear housing member 14 has a cylindrical portion 14b. The cylindrical portion 14b has a hollow that is coaxial with the center hole 14a. The electromagnet 22c is supported by the ball bearing 24 which is provided in the cylindrical portion 14b so as to be rotatable relative to the rear housing member 14 and the front housing member 11.

An annular armature 22e is provided within the front housing member 11. The armature 22e is placed so as to hold the outer clutch plate 22a and the inner clutch plate 22b with the rear housing member 14. In addition, the armature 22e is engaged with the front housing member 11 by means of spline so as to be slidable in the axial direction against the front housing member 11. In the pilot clutch 22, the armature 22e is attracted by the electromagnetic force of the electromagnet 22c and approaches the rear housing member 14. In addition, the respective outer clutch plates 22a and the respective inner clutch plates 22b are held between the armature 22e and the rear housing member 14, and thus, the respective outer clutch plates 22a and the respective inner clutch plates 22b are engaged with each other through friction.

As described above, in the power transmitting device 10, the operation of the main clutch 21 is controlled through the operation control of the pilot clutch 22 by electricity supplied to the electromagnet 22c, that is to say, the control of the engaging force through friction, and thus, the driving force which is transmitted between the front housing member 11 and the inner shaft 12 is controlled.

Next, the configuration of the cam mechanism 23 will be described in detail.

Figure 3:
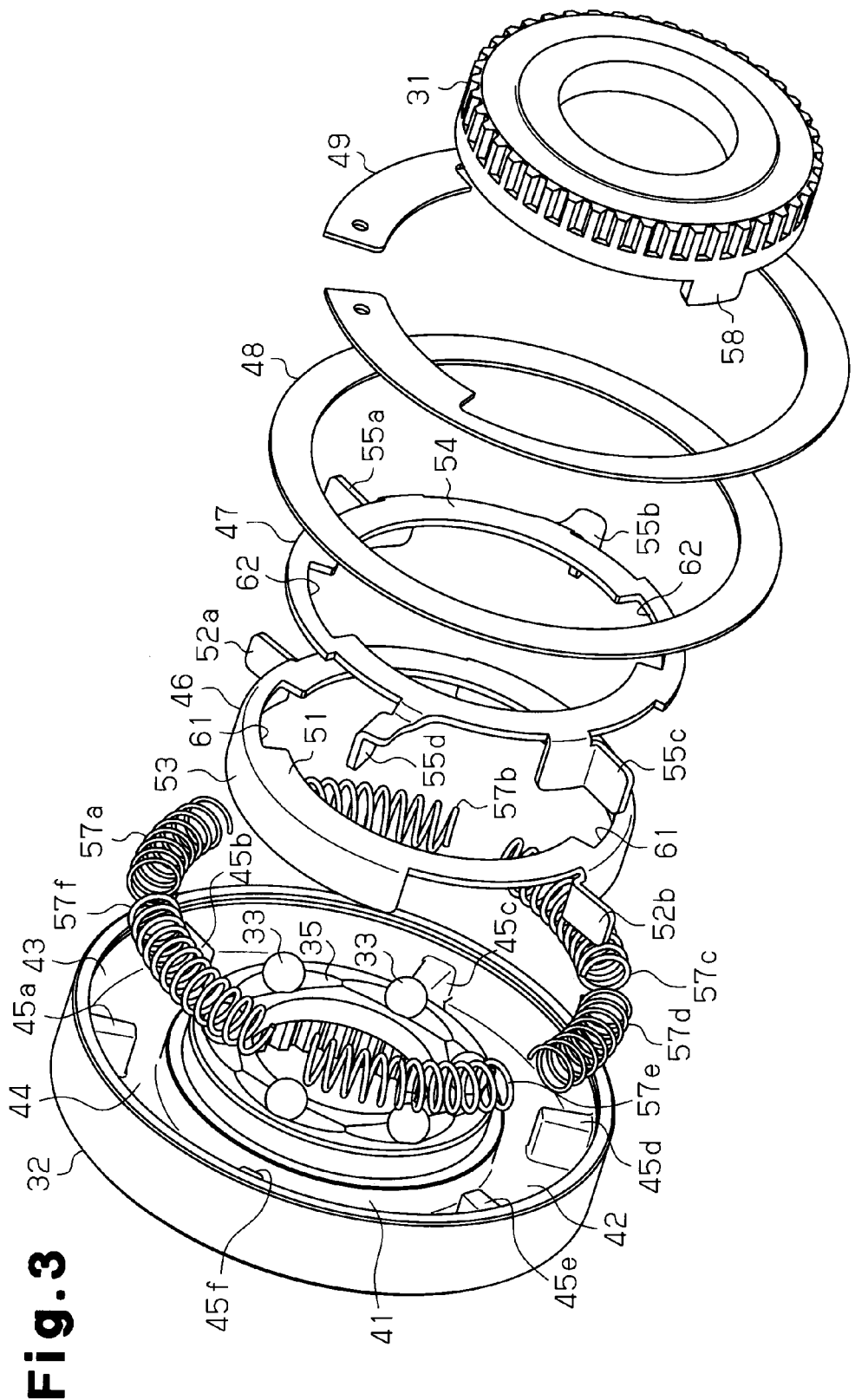
FIG. 3 is an exploded perspective view showing the cam mechanism.

As shown in FIG. 3, the main cam 32 is provided with a boss wall portion 41 into which the inner shaft 12 is inserted, a side wall portion 42 which extends from the outer circumferential portion of the boss wall portion 41 in the radial direction, and an outer circumferential wall portion 43 which is provided on the outer circumferential portion of the side wall portion 42 so as to face the boss wall portion 41. The main cam 32 is provided with a space created between the outer circumferential wall portion 43 and the boss wall portion 41. The space serves as an accommodating portion 44. Cam grooves 35 are formed on the boss wall portion 41 at an equal angular interval. Cam grooves 34 which face the cam groove 35 are formed on the pilot cam 31 (see FIG. 2). The balls 33 (interlocking bodies) are held between the cam grooves 34 and 35 in a state as to make contact with the respective cam grooves 34 and 35. Each of the cam grooves 34 and 35 has an arcuate outer shape, and arranged at an equal interval on a circle the center of which is the rotation axes 11c, 12a. The depth of each of the cam grooves 34, 35 at the center is substantially equal to radius of the balls 33, and gradually decreases from the center to both ends.

Six engaging projections 45a to 45f are aligned in the circumferential direction of the main cam 32 within the accommodating portion 44. The respective engaging projections 45a to 45f are in plate form and extend from the outer circumferential wall portion 43 toward the center of the main cam 32. A forward rotation plate 46 and a reverse rotation plate 47 are engaged with the accommodating portion 44 so as to be rotatable relative to the main cam 32. Furthermore, an annular lid member 48 is engaged with the accommodating portion 44.

The forward rotation plate 46 is provided with an annular main body portion 51 and two forward rotation engaging pieces 52a and 52b which extend outward from the main body portion 51 the radial direction. In addition, the forward rotation plate 46 is provided with a cylindrical portion 53 which extends from the outer periphery of the main body portion 51 toward the main cam 32. The cylindrical portion 53 is placed in the proximity to the center of the main cam 32 relative to the respective engaging projections 45a to 45f. The reverse rotation plate 47 is provided with the annular main body portion 54 and four reverse rotation engaging pieces 55a to 55d which extend outward from the main body portion 54 in the radial direction.

Figure 4:
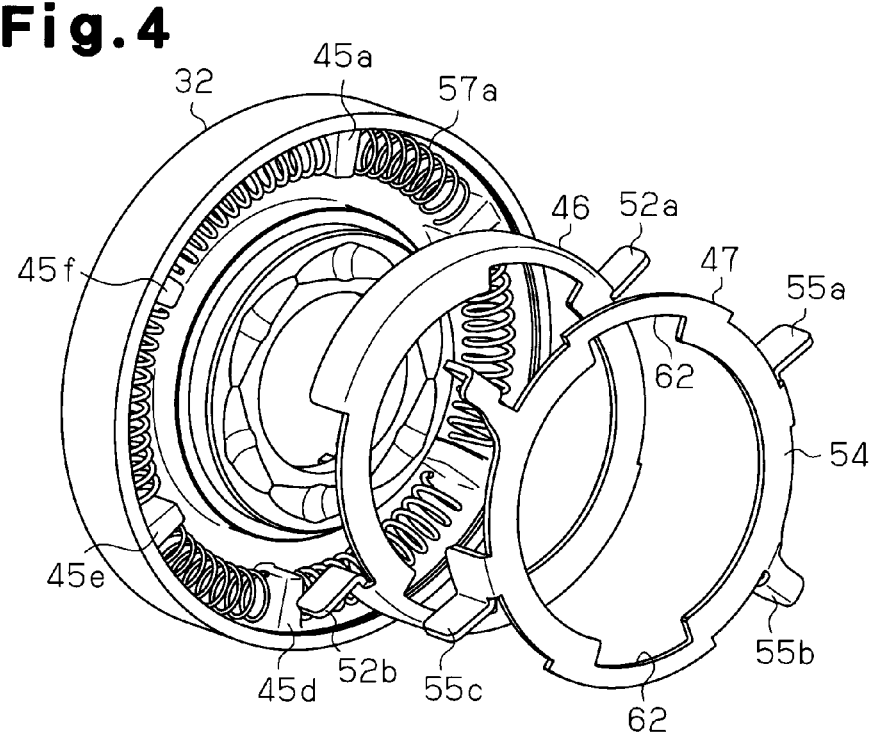
FIG. 4 is a partially exploded perspective view showing the cam mechanism.
Figure 5:
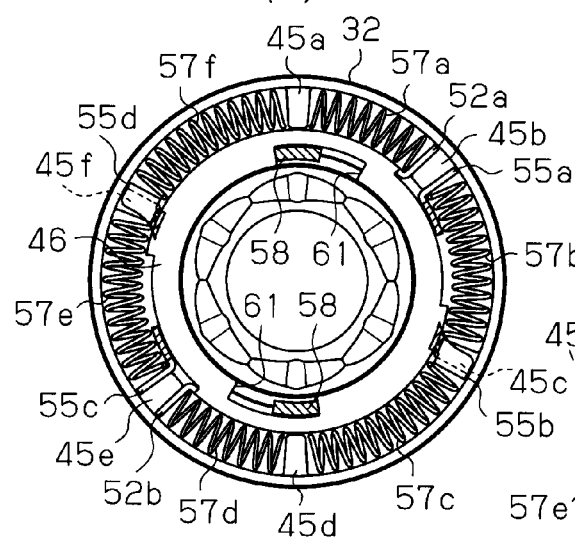
FIG. 5(A) is a cross-sectional view showing the cam mechanism.
FIG. 5(B) is a cross-sectional view showing the cam mechanism.
Figure 5:
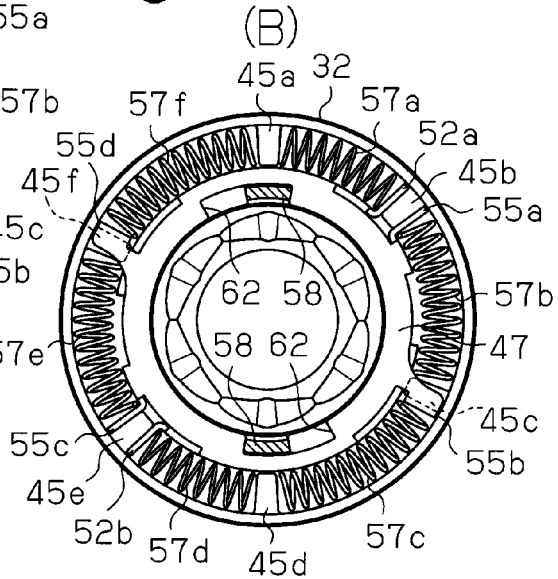

As shown in FIGS. 5(A) and 5(B), the respective forward rotation engaging pieces 52a and 52b as well as the respective reverse rotation engaging pieces 55a to 55d are placed between the respective engaging projections 45a to 45f of the main cam 32. As shown in FIGS. 3 and 4, the cylindrical portion 53 of the forward rotation plate 46, the side wall portion 42 and the outer circumferential wall portion 43 of the main cam 32, and the lid member 48 form spring accommodating chambers for accommodating coil springs 57a to 57f, which are urging members between the respective engaging projections 45a to 45f. The respective coil springs 57a to 57f are compression coil springs. The respective coil springs 57a to 57f urge the respective engaging pieces 52a, 52b and 55a to 55d and the respective engaging projections 45a to 45f in the circumferential direction in such a state as being placed in the respective spring accommodating chambers.

The coil springs 57a and 57d, which are first elastic members, for example, urge the main cam 32 and the forward rotation plate 46 in such a manner that they rotate in the direction opposite to each other. As the main cam 32 and the forward rotation plate 46 rotate relative to each other, the respective engaging pieces 52a and 52b of the forward rotation plate 46 engage with the engaging projections 45b and 45e, which are first limiting portions of the main cam 32. Accordingly, the respective engaging projections 45b and 45e limit the rotations of the main cam 32 and the forward rotation plate 46 relative to each other.

In the same manner, the coil springs 57b, 57c, 57e and 57f, which are second elastic members, urge the main cam 32 and the reverse rotation plate 47 so that they rotate in the direction opposite to each other. The respective coil springs 57a to 57f are provided so as to make the direction of rotation of the forward rotation plate 46 and the direction of rotation of the reverse rotation plate 47 opposite to each other. As the main cam 32 and the reverse rotation plate 47 rotate relative to each other, the respective engaging pieces 55a, 55b, 55c and 55d of the reverse rotation plate 47 engage with the engaging projections 45b, 45c, 45e and 45f, which are the second limiting portions of the main cam 32. Accordingly, the respective engaging projections 45b, 45c, 45e and 45f limit the rotations of the main cam 32 and the reverse rotation plate 47 relative to each other.

A snap ring 49, which is a limiting body, is fitted into the outer circumferential wall portion 43 of the main cam 32. The snap ring 49 is fitted in such a manner as to hold the forward rotation plate 46, the reverse rotation plate 47, and the lid member 48 with the side wall portion 42 of the main cam 32. The snap ring 49 limits the movement of the respective plates 46 and 47, the lid member 48 and the respective coil springs 57a to 57f in the axial direction relative to the main cam 32. The respective plates 46 and 47, the lid member 48, the respective coil springs 57a to 57f and the snap ring 49 move in the axial direction together with the main cam 32.

The pilot cam 31 is provided with two engaging protrusions 58 which extend toward the main cam 32. Engaging recesses 61 and 62, which engage with the respective engaging protrusions 58, are created in the main body portion 51 of the forward rotation plate 46 and the main body portion 54 of the reverse rotation plate 47, respectively. A first inner walls of the engaging recesses 61 of the forward rotation plate 46 engage with the engaging protrusions 58 of the pilot cam 31 when the pilot cam 31 rotates forward (rotates in the counterclockwise direction of FIG. 5(A)) starting from the position shown in FIG. 5(A). Then, a second inner walls of the forward rotation plate 46 engage with the engaging protrusions 58 of the pilot cam 31 when the pilot cam 31 rotates reversely (rotates in the clockwise direction of FIG. 5(A)) by a predetermined angle starting from the above described state. First inner walls of the engaging recesses 62 of the reverse rotation plate 47 engage with the engaging protrusions 58 of the pilot cam 31 when the pilot cam 31 rotates reversely starting from the position shown in FIG. 5(B). Then, second inner walls of the reverse rotation plates 47 of the engaging recesses 62 engage with the engaging protrusions 58 of the pilot cam 31 when the pilot cam 31 rotates forward by a predetermined angle starting from the above described state.

The forward rotation plate 46 and the reverse rotation plate 47 are urged by the respective coil springs 57a to 57f so as to rotate in the directions opposite to each other relative to the main cam 32. Accordingly, the coil springs 57a to 57f urge the forward rotation plate 46 and the reverse rotation plate 47 in such a manner that the engaging protrusions 58 of the pilot cam 31 do not engage with the engaging recesses 61, 62 of the plates 46, 47. At this time, the main cam 32 and the pilot cam 31 are held by the balls 33 between the two cam grooves 35 and 34, which face each other, in such a state as not to generate a transfer force in the axial direction (see FIG. 2). The positions of the main cam 32 and the pilot cam 31 at this time are described in the following as neutral positions.

In the case where the main cam 32 and the pilot cam 31 rotate relative to each other, a force for moving the main cam 32 in the axial direction is generated by the two cam grooves 34 and 35 as well as the balls 33 in accordance with the difference in the angle of rotation. At this time, the respective coil springs 57a to 57f urge the main cam 32 and the pilot cam 31 toward the neutral position via the forward rotation plate 46 or the reverse rotation plate 47.

As shown in FIG. 5(A), for example, in the case where the pilot cam 31 rotates forward (rotates in the counterclockwise direction of the figure), the engaging protrusions 58 of the pilot cam 31 engage with the engaging recesses 61 of the forward rotation plate 46 so that the forward rotation plate 46 rotates forward. At this time, the respective coil springs 57a and 57d between the respective engaging pieces 52a and 52b of the forward rotation plate 46 and the respective engaging projections 45a and 45d of the main cam 32 urge the forward rotation plate 46 in the direction opposite to the direction of rotation of the pilot cam 31, and urge the main cam 32 in the same direction as the direction of the rotation of the pilot cam 31. That is to say, the respective coil springs 57a and 57d urge the cam mechanism 23 toward the neutral position. Thus, when the respective engaging pieces 52a and 52b of the forward rotation plate 46 engage with the respective engaging projections 45b and 45e of the main cam 32, the coil springs do not urge the cam mechanism more. Accordingly, the respective engaging projections 45b and 45e engage with the respective engaging pieces 52a and 52b of the forward rotation plate 46, and thus, limit the rotations of the main cam 32 and the pilot cam 31 relative to each other beyond the neutral position.

In the same manner, as shown in FIG. 5(B), in the case where the pilot cam 31 rotates reversely (rotates in the clockwise direction of the figure), the respective coil springs 57a to 57f urge the main cam 32 in the same direction as the pilot cam 31, that is to say, in such a direction that the cam mechanism 23 is held at the neutral position. When the respective engaging pieces 55a to 55d of the reverse rotation plate 47 engage with the respective engaging projections 45b, 45c, 45e and 45f of the main cam 32, the rotations of the main cam 32 and the pilot cam 31 relative to each other beyond the neutral position are limited. In the case where the main cam 32 rotates, the operation is the same as the above, and therefore, the descriptions thereof are omitted.

The cam mechanism 23 according to the present embodiment is provided with two coil springs 57a and 57d for urging the forward rotation plate 46 and four coil springs 57b, 57c, 57e and 57f for urging the reverse rotation plate 47. The numbers of the coil springs for each plate 46 and 47 are different in order to differentiate the forces for urging the main cam 32 and the pilot cam 31 toward the neutral position. That is to say, by providing different numbers of coil springs, the urging force generated between the reverse rotation plate 47 and the main cam 32 is greater than the urging force generated between the forward rotation plate 46 and the main cam 32. As a result, the main cam 32 does not move unless rotational torque which is greater than the rotational torque applied to the forward rotation plate 46 is applied to the reverse rotation plate 47. That is to say, it is more difficult for the reverse rotation plate 47 to move the main cam 32 than for the forward rotation plate 46 to move the main cam 32. In other words, greater rotational torque becomes necessary to move the main cam 32 and the pilot cam 31 relative to each other.

Figure 6:
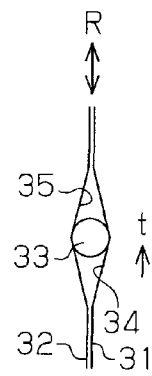
FIG. 6(A) is a diagram for illustrating the operation of the cam mechanism.
FIG. 6(B) is a diagram for illustrating the operation of the cam mechanism.
FIG. 6(C) is a diagram for illustrating the operation of the cam mechanism.
Figure 6:
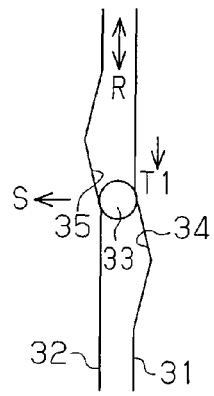
Figure 6:
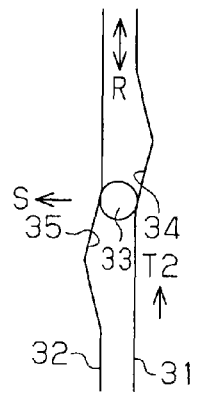
Figure 7:
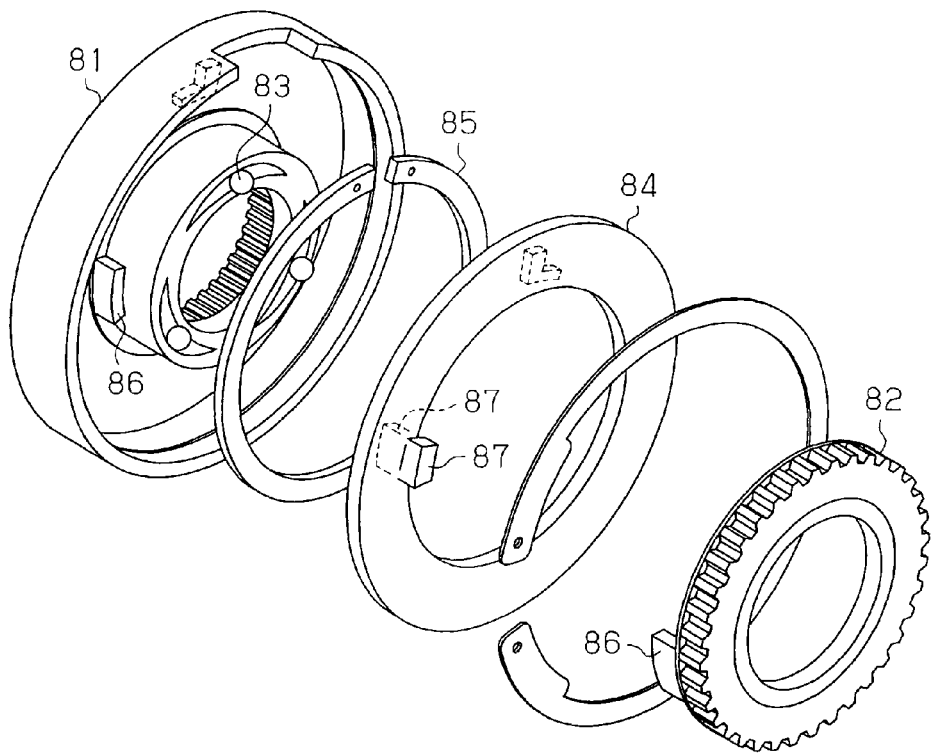
FIG. 7 is an exploded perspective view showing a prior art cam mechanism.

In the case where rotational torque t, which is small relative to the elastic force of the respective coil springs 57a to 57f, is applied to the pilot cam 31 in the above described power transmitting device 10, for example, the respective coil springs 57a to 57f urge the main cam 32 toward the neutral position. Therefore, as shown in FIG. 6(A), the pilot cam 31 and the main cam 32 rotate without having a relative difference in the angle. Accordingly, no force is applied to the main cam 32 in the axial direction, and therefore, the movement of the main cam 32 in the axial direction is limited.

As shown in FIG. 6(B), in the case where rotational torque T1 is applied to the pilot cam 31 against the elastic force of the respective coil springs 57a and 57d, there is a relative difference in the angle between the pilot cam 31 and the main cam 32 so that the balls 33 move toward the respective cam grooves 34 and 35, and thus, a force in the axial direction is applied to the main cam 32. As a result of this force, the main cam 32 moves along the axis so that the main clutch 21 is engaged and the driving force is transmitted from the driving side (the front housing member 11) to the driven side (the inner shaft 12).

As shown in FIG. 6(C), when rotational torque T2 is applied to the pilot cam 31 against the elastic force of the respective coil springs 57b, 57c, 57e and 57f, there is a relative difference in the angle between the pilot cam 31 and the main cam 32 so that the balls 33 move toward the respective cam grooves 34 and 35, and thus, a force in the axial direction is generated in the main cam 32. As a result of this force, the main cam 32 moves along the axis so that the main clutch 21 is connected and the driving force is transmitted.

Due to the rotational difference between the front wheels and the rear wheels, rotational torque is generated. In the case where the pilot clutch 22 is cut off so that the number of rotations of the rear wheels is greater than the number of rotations of the front wheels, that is for example, when the vehicle is being towed, drag torque is generated in the pilot clutch 22 due to the rotations of the rear wheels, and as a result of this drag torque, the pilot cam 31 rotates, and thus, the reverse rotation plate 47 rotates. The drag torque generated at this time is smaller than the elastic force of the respective coil springs 57b, 57c, 57e and 57f, and therefore, the respective coil springs 57b, 57c, 57e and 57f urge the main cam 32 toward the neutral position. As a result, the rotations of the pilot cam 31 and the main cam 32 relative to each other are limited, and therefore, a pressing force is prevented from being generated in the main clutch 21.

Conversely, in the case where the number of rotations of the front wheels is greater than that of the rear wheels, for example, at the time of quick start or when tires having different diameters are mounted, drag torque is generated in the pilot clutch 22 due to the rotations of the front wheels, and as a result of this drag torque, the pilot cam 31 rotates, and thus, the forward rotation plate 46 rotates. The drag torque generated at this time is smaller than the elastic force of the respective coil springs 57a and 57d, and therefore, the respective coil springs 57a and 57d urge the main cam 32 toward the neutral position. As a result, the rotations of the pilot cam 31 and the main cam 32 relative to each other are limited, and therefore, a pressing force is prevented from being generated in the main clutch 21.

According to the present embodiments described above, the following advantages are gained.

(1) The cam mechanism 23 is provided with the forward rotation plate 46 and the reverse rotation plate 47. The respective plates 46 and 47 are urged by the respective coil springs 57a to 57f in the directions opposite to each other. In the case where the number of rotations of the rear wheels is greater than the number of rotations of the front wheels, the reverse rotation plate 47 rotates. Thus, the main cam 32 urged by the respective coil springs 57b, 57c, 57e and 57f toward the neutral position rotates together with the reverse rotation plate 47 when the reverse rotation plate 47 rotates, and the rotations of the pilot cam 31 and the main cam 32 relative to each other are limited. In the case where the number of rotations of the front wheels is greater than the number of rotations of the rear wheels, the forward rotation plate 46 rotates. Thus, the main cam 32 urged by the respective coil springs 57a and 57d toward the neutral position rotates together with the forward rotation plate 46 when the forward rotation plate 46 rotates, and the rotations of the pilot cam 31 and the main cam 32 relative to each other are limited. In this configuration, the rotations of the pilot cam 31 and the main cam 32 relative to each other, which are caused by the rotational difference between the front and rear wheels, are limited. As a result, a pressing force is prevented from being generated in the main clutch 21 and the drag torque is reduced in the main clutch 21. In addition, the drag torque is reduced so that the load on the engine is reduced when the pilot clutch 22 is cut off, and thus, an increase in the fuel efficiency of the vehicle is achieved.

In addition, since the drag torque is reduced, the controllability of the front wheels and the rear wheels improves. In the case where the brake force on the front wheels and the rear wheels is controlled, respectively, for example, the drag torque is not added to the control or the effects by the drag torque become small. As a result, the brake force on the front wheels and the rear wheels is easily controlled.

(2) The urging force working between the main cam 32 and the forward rotation plate 46 and the urging force working between the main cam 32 and the reverse rotation plate 47 are differentiated, and thus, the generated drag torque can be changed between the case where the number of rotations of the front wheels is greater than the number of rotations of the rear wheels and the case where the number of rotations of the rear wheels is greater than the number of rotations of the front wheels.

(3) The number of coil springs 57a and 57b placed between the main cam 32 and the forward rotation plate 46, and the number of coil springs 57b, 57c, 57e and 57f placed between the main cam 32 and the reverse rotation plate 47 are differentiated, and thus, the urging force working between the main cam 32 and the forward rotation plate 46 and the urging force working between the main cam 32 and the reverse rotation plate 47 can be separately and easily set.

(4) The respective engaging pieces 52a and 52b of the forward rotation plate 46 are engaged with the respective engaging projections 45b and 45e of the main cam 32, or the respective engaging pieces 55a to 55d of the reverse rotation plate 47 are engaged with the respective engaging projections 45b, 45c, 45e and 45f of the main cam 32, and thus, the rotations of the main cam 32 and the pilot cam 31 relative to each other beyond the neutral position are limited.

The above described embodiment may be modified as follows.

In the above illustrated embodiment, the power transmitting device is applied to a front wheel-drive based four-wheel drive vehicle. However, the present invention may be applied to a rear wheel drive-based four-wheel drive vehicle where the engine is mounted in the rear portion of the vehicle.

In the above illustrated embodiment, the number of coil springs is changed in order to differentiate the urging force working between the main cam 32 and the forward rotation plate 46 and the urging working between the main cam 32 and the reverse rotation plate 47. However, at least one from among the number, the length and the thickness of the coil springs may be changed.

In the above illustrated embodiment, the urging force is generated by the respective coil springs 57a to 57f between the main cam 32 and the respective plates 46 and 47. However, the urging force may be generated by torsion springs.

In the above illustrated embodiment, the main cam 32 is moved in accordance with the relative angle between the pilot cam 31 and the main cam 32 so as to generate a pressing force in the main clutch 21 by using the balls 33 and the two cam grooves 34 and 35. Instead of this, an inclining surface which inclines in the circumferential direction may be provided on the contacting surfaces of the pilot cam 31 and the main cam 32, and the main cam 32 may be moved along the axis in accordance with the relative angle between the pilot cam 31 and the main cam 32.

The invention claimed is:

1. A power transmitting device for transmitting a driving force between front wheels and rear wheels, comprising:
   a first rotational member linked to the front wheels;
   a second rotational member linked to the rear wheels;
   a main clutch provided between the two rotational members for controlling the transmission of driving force between the two rotational members; and
   a cam mechanism for applying a pressing force in an axial direction to the main clutch,
   wherein the cam mechanism has a first cam member and a second cam member,
   wherein the first and second cam members rotate relative to each other due to rotational torque transmitted via the first or second rotational member, and thus, a pressing force in the axial direction is applied to the main clutch,
   wherein the cam mechanism has a first elastic member for urging the first cam member to rotate toward a neutral position where no pressing force is applied to the main clutch, and a second elastic member for urging the second cam member to rotate toward the neutral position, and wherein the rotational direction which the second elastic member urges the second cam member to rotate is opposite to the rotational direction which the first elastic member urges the first cam member to rotate.

2. The power transmitting device according to claim 1, further comprising:
a first limiting portion for limiting the rotation of the first cam member relative to the second cam member beyond the neutral position; and
a second limiting portion for limiting the rotation of the second cam member relative to the first cam member beyond the neutral position.

3. The power transmitting device according to claim 1, wherein the urging force created by the first elastic member and the urging force created by the second elastic member are different.

4. The power transmitting device according to claim 1, further comprising a pilot clutch located between the rotational members, the pilot clutch controlling the transmission of driving force between the first rotational member and the cam mechanism,
wherein the pilot clutch includes an electromagnetic clutch member, an armature supported within the first rotational member, an outer clutch member engaged with the first rotational member, and an inner clutch member engaged with the cam mechanism, and
wherein, when the armature is attracted by the electromagnet so that the outer clutch member and the inner clutch member are frictionally engaged, the first rotational member and the cam mechanism are coupled to each other such that torque can be transmitted therebetween.

5. A power transmitting device for transmitting a driving force between front wheels and rear wheels, comprising:
a first rotational member linked to the front wheels;
a second rotational member linked to the rear wheels;
a main clutch provided between the two rotational members for controlling the transmission of driving force between the rotational members; and
a cam mechanism for applying a pressing force in an axial direction to the main clutch, wherein the cam mechanism has a first cam member and a second cam member, wherein the first and second cam members rotate relative to each other due to rotational torque transmitted via the first or second rotational member, and thus, a pressing force in the axial direction is applied to the main clutch,
wherein the cam mechanism has including:
a ball located between the first and second cam members;
a forward rotation plate having an annular main body portion provided with a plurality of engaging recesses and a plurality of forward rotation engaging pieces which extends outward from the main body portion in the radial direction;
a reverse rotation plate having an annular main body portion provided with a plurality of engaging recesses and a plurality of reverse rotation engaging pieces which extends outward from the main body portion in the radial direction;
a first elastic member for urging the first cam member toward a neutral position where no pressing force is applied to the main clutch, and
a second elastic member for urging the second cam member toward the neutral position; and
wherein the direction which the second elastic member urges is opposite to the direction which the first elastic member urges,
wherein the second cam member has an outer circumferential wall portion and a plurality of engaging portions which extends inward from the outer circumferential wall portion in the radial direction,
wherein the first elastic member urges the engaging portions of the second cam member and the forward rotation engaging pieces;
wherein the second elastic member urges the engaging portions of the second cam member and the reverse rotation engaging pieces,
wherein the first cam member is provided with a plurality of engaging protrusions, and
wherein when the first cam member rotates reversely by a predetermined angle, the engaging protrusion of the first cam member engages with an inner wall of the engaging recess of the forward rotation plate, when the first cam member rotates the forward rotation plate, when the first cam member rotates forward by a predetermined angle, the engaging protrusion of the first cam member engages with an inner wall of the engaging recess of the reverse rotation plate.

6. The power transmitting device according to claim 5, further comprising:
a first limiting portion for limiting the rotation of the first cam member relative to the second cam member beyond the neutral position; and
a second limiting portion for limiting the rotation of the second cam member relative to the first cam member beyond the neutral position.

7. The power transmitting device according to claim 5, wherein the urging force created by the first elastic member and the urging force created by the second elastic member are different.

8. The power transmitting device according to claim 5, further comprising a pilot clutch located between the rotational members, the pilot clutch controlling the transmission of driving force between the first rotational member and the cam mechanism,
wherein the pilot clutch includes an electromagnetic clutch member, an armature supported within the first rotational member, an outer clutch member engaged with the first rotational member, and an inner clutch member engaged with the cam mechanism, and
wherein, when the armature is attracted by the electromagnet so that the outer clutch member and the inner clutch member are frictionally engaged, the first rotational member and the cam mechanism are coupled to each other such that torque can be transmitted therebetween.

* * * * *